US008385310B2

(12) United States Patent
Hottinen et al.

(10) Patent No.: US 8,385,310 B2
(45) Date of Patent: Feb. 26, 2013

(54) OPTIMAL USER PAIRING FOR DOWNLINK MULTIUSER MIMO

(75) Inventors: Ari Tapani Hottinen, Espoo (FI); Emanuele Viterbo, Turin (IT)

(73) Assignee: Nokia Corporation, Espoo (FI)

(*) Notice: Subject to any disclaimer, the term of this patent is extended or adjusted under 35 U.S.C. 154(b) by 885 days.

(21) Appl. No.: 12/344,384

(22) Filed: Dec. 26, 2008

(65) Prior Publication Data

US 2009/0303979 A1 Dec. 10, 2009

Related U.S. Application Data

(60) Provisional application No. 61/009,353, filed on Dec. 28, 2007.

(51) Int. Cl.
*H04J 3/00* (2006.01)
(52) U.S. Cl. .................. 370/345; 370/330; 370/342
(58) Field of Classification Search .................. 370/204, 370/330, 342, 345
See application file for complete search history.

(56) References Cited

U.S. PATENT DOCUMENTS

2006/0121946 A1* 6/2006 Walton et al. .................. 455/561
2006/0285606 A1 12/2006 Khojastepour et al.

FOREIGN PATENT DOCUMENTS
WO  WO 2009/083782 A3  7/2009

OTHER PUBLICATIONS

International Search Report and Written Opinion, in correspnding PCT Application No. PCT/IB2008/003632, issued by European Patent Office (ISA), Jul. 29, 2009, 9 pages.

Ajib, Wessam, et al., "An Overview of Scheduling Algorithms in MIMO-Based Fourth-Generation Wireless Systems", IEEE Network, Sep./Oct. 2005, pp. 43-48.
Bandemer, Bernd, et al., "Capacity-Based Uplink Scheduling Using Long-Term Channel Knowledge", IEEE International Conference, Jun. 1, 2007, pp. 785-790.
Chan, Peter W.C., et al., "Performance Comparison of Downlink Multiuser MIMO-OFDMA and MIMO-MC-CDMA with Transmit Side Information-Multi-Cell Anaylsis", IEEE Transactions on Wireless Communications, vol. 6, No. 6, Jun. 2007, pp. 2193-2203.
R.W. Heath Jr., M. Airy, and A.J. Paulraj, "Multiuser diversity for MIMO wireless systems with linear receivers" Conference Record of the Thirty Fifth Asilomar Conference on Signals, Systems andComputers, Nov. 4-7, 2001, vol. 2, (pp. 1194-1199).
H.W. Kuhn, "The Hungarian Method for the assignment problem," Naval Research Logistic Quarterly, 2:83 97,(1955), (pp. 83-97).
C. Wang, R. Murch, "Adaptive Downlink Multi-User MIMO Wireless Systems for Correlated Channels with Imperfect CSI", III Transactions on Wireless Communications, vol. 5, No. 9, (Sep. 2006), (pp. 2435-2446).
Aktas, et al, "Multiuser Scheduling for MIMO Wireless Systems", Vehicular Technology Conference, (Oct. 2003), (pp. 1743-1747).
Hottinen, et al., "Optimal User Pairing in Downlink MU-MIMO with Transmit Precoding", Modeling and Optimization in Mobile, Ad Hoc, and Wireless Networks and Workshops, (Apr. 2008), (3 pages).
Viterbo, "Optimal User Pairing for Multiuser MINO", Spread Spectrum Techniques and Application, (Aug. 2008), (pp. 242-246).

(Continued)

*Primary Examiner* — Pao Sinkantarakorn
*Assistant Examiner* — Richard K Chang
(74) *Attorney, Agent, or Firm* — Harrington & Smith

(57) ABSTRACT

A method includes operating a transmitter connected with $n_t$ transmit antennas serving K users having $n_r$ receive antennas each; and scheduling which users are to be simultaneously served in a same time-frequency-code slot. A particular user pairing configuration is denoted by $\pi$ within a set of all configurations $\Pi$, and scheduling includes expressing mutual information as an additive objective function and maximizing the additive objective function over a particular choice of $\pi \in \Pi$.

17 Claims, 2 Drawing Sheets

OTHER PUBLICATIONS

Zhang, "Scheduling for Maximum Capacity in SDMA/TDMA Networks", IEEE International Conference on Acoustics, Speech and Signal Processing, (2002), (pp. III-2141-III-2144).

3GPP TSG-RAN1 WG1 #43, "UL Virtual MIMO System Level Performance Evaluation for E-UTRA", R1-051422, (Nov. 7-11, 2005), (5 pages).

* cited by examiner

OPTIMAL USER PAIRING FOR DOWNLINK MULTIUSER MIMO

RELATED APPLICATION

This patent application claims priority to U.S. Provisional Application No. 61/009,353, filed Dec. 28, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for transmitting multiple-input, multiple-output radio frequency signals to a receiver.

BACKGROUND

Various abbreviations that appear in the specification and/or in the drawing figures are defined as follows:

| | |
|---|---|
| BS | base station |
| CDMA | code division multiple access |
| DL | downlink (BS to MS) |
| EUTRAN | evolved universal terrestrial radio access network |
| FDMA | frequency division multiple access |
| LTE | long term evolution |
| MIMO | multiple-input, multiple-output |
| MF | matched filter |
| ML | maximum likelihood |
| MMSE | minimum mean squared error |
| MS | mobile station |
| MU | multiuser |
| SDMA | spatial division multiple access |
| TDMA | time division multiple access |
| WiMAX | worldwide interoperability for microwave access (IEEE 802.16) |

MIMO takes advantage of multiplexing to increase wireless bandwidth and range. MIMO algorithms send information out over two or more antennas and the information is received via multiple antennas. While in a conventional sense such multiplexing would cause interference, MIMO uses the additional pathways to transmit more information and then recombines the signal at the receiver. A MIMO system provides a significant capacity gain over conventional single antenna systems, in addition to more reliable communication.

Various publications that may be of interest herein include:

W. Ajib and D. Hoccoun, "An overview of scheduling algorithms in MIMO-based fourth-generation wireless systems," IEEE Network, September/October 2005, incorporated by reference;

R. W. Heath Jr., M. Airy, and A. J. Paulraj, "Multiuser diversity for MIMO wireless systems with linear receivers" Conference Record of the Thirty-Fifth Asilomar Conference on Signals, Systems and Computers, 4-7 November 2001, Vol. 2, pp. 1194-1199, incorporated by reference;

B. Bandemer, S. Visuri, "Capacity-Based Uplink Scheduling Using Long-Term Channel Knowledge," ICC '07. IEEE International Conference on Communications, 24-28 Jun. 2007, pp. 785-790, incorporated by reference; and H. W. Kuhn, "The Hungarian Method for the assignment problem," Naval Research Logistic Quarterly, 2:83-97, 1955, and also incorporated by reference.

Reference may also be made to C. Wang, R. Murch, "Adaptive Downlink Multi-User MIMO Wireless Systems for Correlated Channels with Imperfect CSI", III Transactions on Wireless Communications, Vol. 5, No. 9, pp. 2455-2446, September 2006, and incorporated by reference. This publication discusses in Section D an adaptive MU-MIMO grouping algorithm, where a number of users in a group may be constrained to be two.

In general, a MU-MIMO uplink (multipoint-to-point) system is characterized by K users with $n_t$ antennas each communicating to a base station or to a receiver with $n_r$ receive antennas. Since each user faces a different channel condition in different time/frequency/code (TFC) slots it is possible to improve the overall system capacity by MU scheduling. Provided that spatial separation of the users is sufficient, it is possible to have two or more users assigned to the same time-frequency-code slot (i.e., to also use SDMA or Spatial Division Multiple Access). This technique attempts to increase the system capacity by intelligently allocating the channel to different subgroups of users. In downlink (point-to-multipoint) channels, the problem is different in that there is one source transmitting to K users. A general introduction to this topic can be found in W. Ajib and D. Hoccoun, "An overview of scheduling algorithms in MIMO-based fourth-generation wireless systems," IEEE Network, September/October 2005. Among the most popular MU scheduling schemes are opportunistic scheduling and best subset selection. All scheduling schemes are confronted with a fairness issue that may force the sacrifice of overall network optimality in order to guarantee all users with a minimum service requirement.

SUMMARY

The foregoing and other problems are overcome, and other advantages are realized, by the exemplary embodiments of this invention.

In one exemplary aspect thereof the embodiments of this invention provide a method that includes operating a transmitter connected with $n_t$ transmit antennas serving K users having $n_r$ receive antennas each; and scheduling which users are to be simultaneously served in a same time-frequency-code slot. A particular user pairing configuration is denoted by $\pi$ within a set of all configurations $\Pi$, and where optimally scheduling comprises expressing mutual information as an additive objective function and maximizing the additive objective function over a particular choice of $\pi \in \Pi$.

DETAILED DESCRIPTION

The exemplary embodiments of this invention relate to downlink (or point-to-multipoint) wireless channels that include user scheduling. In particular, the exemplary embodiments of this invention relate to the use and allocation of, for example, beamformed or multi-antenna channels in MIMO links. The exemplary embodiments of this invention may be used in, as non-limiting examples, LTE and WiMax/WiFi communication systems.

The use of the exemplary embodiments of this invention provides scheduling decisions (comprising particular ways of pairing users (receivers) for downlink beams) that are network optimal in that they maximize total capacity in accordance with certain fairness criteria. In particular, the exemplary embodiments of this invention provide an optimal polynomial-time algorithm for determining scheduling and beam-assignment of K users to time-frequency-code (TFC) slots, where in at least one slot there are simultaneously at least two users present.

The exemplary embodiments of this invention pertain as well to fixed beamforming and to spatial division multiple access (SDMA) techniques.

Figure 1:
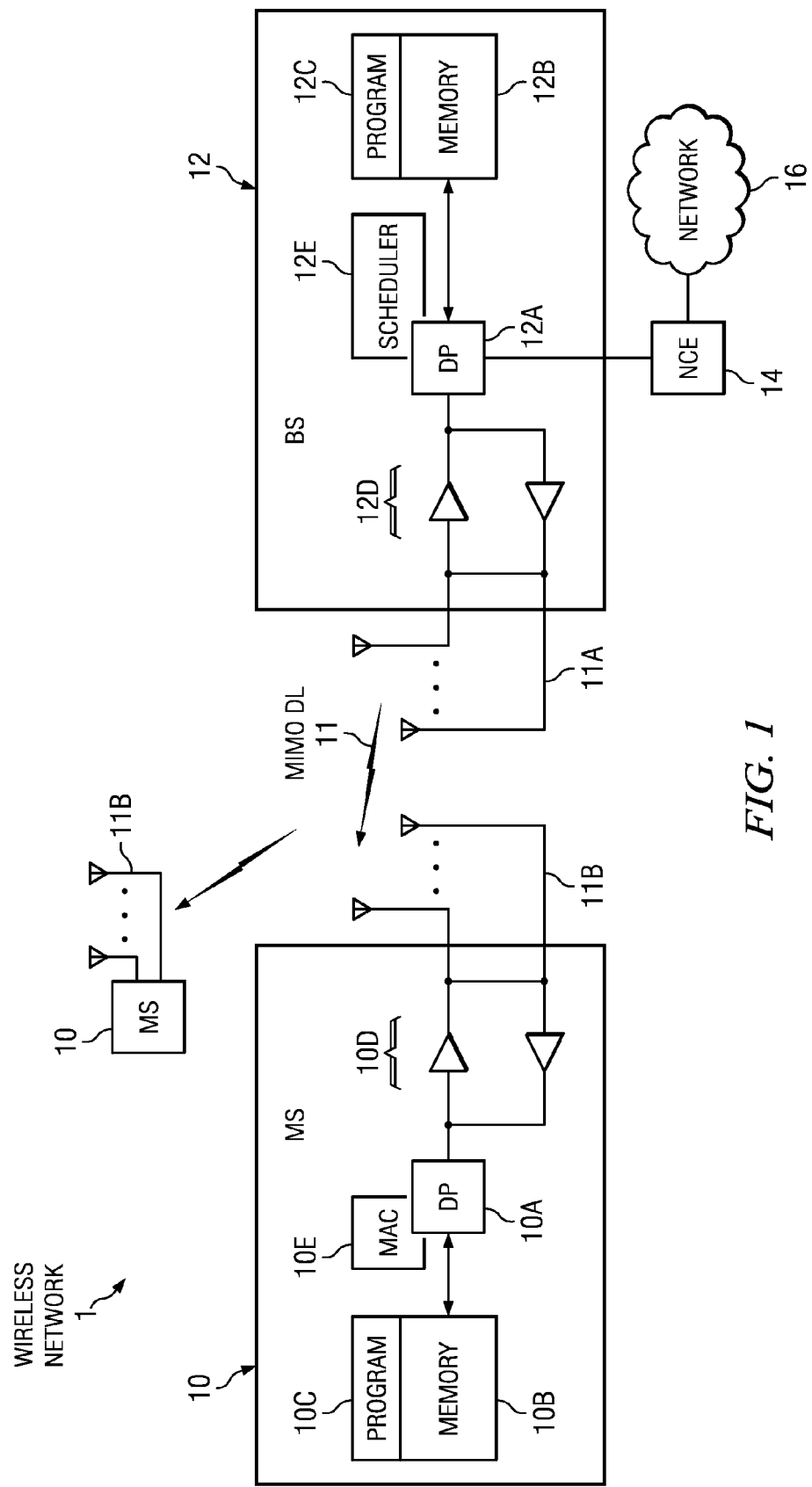
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with mobile stations (MSs) 10, also referred to as user equipment (UEs) or as user terminals (UTs), via a base station (BS) 12, also referred to as a Node B or, in the E-UTRAN (LTE) system as an evolved Node B (eNB). The wireless network 1 may include a network control element (NCE) 14 or a gateway that may provide connectivity with a network 16, such as the Internet. The MS 10 includes a data processor (DP) 10A, a memory (MEM) 10B that stores a program (PROG) 10C, and a suitable radio frequency (RF) transceiver 10D for bidirectional wireless communications with the BS 12, which also includes a DP 12A, a MEM 12B that stores a PROG 12C, and a suitable RF transceiver 12D.

The BS 12 is assumed to include a MS 10 scheduler unit or function 12E that operates in accordance with the exemplary embodiments of this invention described below. As such, at least the PROG 12C is assumed to include program instructions that, when executed by the associated DP 12A, enable the BS 12 to operate in accordance with the exemplary embodiments of this invention. The exemplary embodiments of this invention may be implemented at least in part by computer software executable by the DP 12A of the BS 12, or by hardware, or by a combination of software and hardware.

In the preferred embodiments the wireless link 11 between the BS 12 and the MSs 10 is a multiuser MIMO link, and there typically are plural transmit antennas 11A at the BS 12 and plural receive antennas 11B at the MS 10.

In general, the various embodiments of the MS 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

In accordance with an aspect of the invention only a subset of the users are to be transmitting simultaneously, and a different two users are designated to occupy least two different slots. These scheduling decisions are made using channel state information (feedback, or channel reciprocity). The fact that two users are active is a practical (non-limiting) assumption that reflects a desire to achieve implementation simplicity (fewer interferers for terminals, simpler transmit processing with or without predistortion). The transmitter obtains channel state information (CSI) of different users, and uses the CSI to compute an assignment matrix or assignment information.

The use of the exemplary embodiments of this invention maximizes channel capacity by optimal user pairing, while enabling the use of a simple receiver at the destination node. When the pairs of users are computed optimally, MMSE detection reaches essentially ML performance with sufficiently many users.

The exemplary embodiments are now described in further detail.

MU-MIMO Downlink System Model

A multiuser multiple-input-multiple-output (MU-MIMO) downlink system is comprised of a transmitter, embodied as the BS 12, with $n_t$ transmit antennas 11A serving K users (MSs 10) with $n_r$ receive antennas 11B each (note that the MSs 10 may have different numbers of antennas, however it is assumed herein that they all have the same number of antennas to simplify the notation). The BS 12 sends individual information to the K users as in a wireless system. Time/frequency/code (TFC) slots are assumed to be orthogonal resources and can be used to serve the different MSs 10. Alternatively, beamforming can be performed by the transmitter (BS 12) in the same TFC slot in order to serve more than one MS 10.

Beamforming requires knowledge of the channel of each user at the BS 12 transmitter. When this channel knowledge is not perfect, or preceding is not fully optimized (e.g., some clipping is introduced due to some peak power limitation), beamforming becomes a non-orthogonal resource.

Using different orthogonal resources each MS 10 can detect its information using a receiver which has knowledge of its own channel matrix only. With non-orthogonal resources each MS 10 can extract their respective information by using MF, or MMSE, or ML detection. In the case of multiuser MMSE or ML detection, however, the MS 10 requires the channel or modulation information of all the other MSs 10, or at least two receiver antennas. Because of this requirement only MF detection is a viable approach. However, MF detection suffers from large losses with high multiuser interference.

It is possible to improve the overall system capacity by user scheduling, i.e., selecting which users should be served on the non-orthogonal resources.

The signal received by user k is given by $$y^{(k)} = H^{(k)} \sum_{l=1}^{K} U^{(l)} x^{(l)} + z^{(k)} \tag{1}$$

where:
$H^{(k)} \in \mathbb{C}^{n_r \times n_t}$ the channel coefficient matrix to user k;
$U^{(l)} \in \mathbb{C}^{n_t \times N}$ the channel beamforming matrix to user
$x^{(l)} \in \mathbb{C}^{N}$ are the transmitted vectors to users l=1, . . . , K containing N information symbols; and
$z^{(k)} \in \mathbb{C}^{n_r}$ the white Gaussian noise vector distributed as N(0, $I_{n_r}$).

Let P be the total transmitted power by the BS 12 and SNR=P. Assume that the k-th user receiver (the k-th MS 10 in FIG. 1) has knowledge of only its own channel matrix $H^{(k)}$ and $U^{(k)}$. One may rewrite Eq. (1) in equivalent matrix form as:

$$y^{(k)} = H^{(k)}[U^{(1)}| \ldots |U^{(K)}]\begin{bmatrix} x^{(1)} \\ \vdots \\ x^{(K)} \end{bmatrix} + z^{(k)}. \quad (2)$$

The beamforming matrices may be arbitrary, but different for at least two different users. They may correspond to transpose conjugates of the corresponding channel matrices H, or any other matrices or operators (possibly non-linear) that depend on H. As an example, a viable beamforming matrix may be found from a scalar multiple (power normalized) pseudo-inverse of H, which nulls the interference completely between any paired users at the expense of lower received signal power. In any case, the exemplary embodiments of this invention are specified for any particular transmitter operations.

Scheduling Users

Consider a joint design of a TDMA/FDMA/CDMA/SDMA scheme to reduce the number of simultaneous users allocated in different TFC slots within a given frame. In order to preserve fairness all users should obtain the same amount of TFC slots within a frame. Since the channel matrices for the users are different, and determine how the user signals interfere at the receiver, the exemplary embodiments of this invention optimally schedule which users should simultaneously be served in the same TFC slot in order to at least improve the total system throughput. This optimal scheduling may be assumed to be performed by the scheduler function 12E at the BS 12.

It is assumed herein for convenience that the matrices $H^{(k)}$ are constant over the entire frame.

Pairing Users

First consider the case where K is even and users are paired to transmit simultaneously in the same TFC slot. The total number of TFC slots (or channel orthogonal resources) in one frame should be at least N=K/2 (or some multiple thereof). Fairness is provided by the fact that all users access the channel once within a frame of N TFC slots. In this case it can be shown that the received signals by users $k_1$ and $k_2$ in the n-th TFC slot is $$y^{(k_1)}(n) = H^{(k_1)}[U^{(k_1)}x^{(k_1)} + U^{(k_2)}x^{(k_2)}] + z^{(k_1)}(n) \; n=1,\ldots,N \quad (3)$$

$$y^{(k_2)}(n) = H^{(k_2)}[U^{(k_2)}x^{(k_2)} + U^{(k_1)}x^{(k_1)}] + z^{(k_2)}(n) \; n=1,\ldots,N \quad (4)$$

where there are N distinct pairs $(k_1, k_2)$ of users, with $k_1 \neq k_2$.

Note that the users are assumed to be unable to cooperate in decoding, so that only the MF scheme is possible to use.

Denote by π a particular pairing configuration, within the set of all configurations Π. For example, with K=4 users there are three configurations:
Π={{(12)(34)}, {(13)(24)}, {(14)(23)}}.
For K=2,4,6,8,10,16 there are a number of configurations: |Π| =1,3,15,105,945,2027025.

Mutual information may be written as additive objective functions to be maximized over the choice of π∈Π

$$\max_{\pi \in \Pi} \sum_{(k_1,k_2) \in \pi}^{(N)} f_{k_1,k_2}(\pi). \quad (5)$$

Exhaustively selecting the pair of users that maximizes the above mutual information can become a formidable task. As such, it is shown below how this can be accommodated by the Hungarian method.

Both Single Users and Paired Users

Consider now the case where some users are allowed to receive alone (not paired with another user), and some other users are to be paired in the TFC slots.

A user $k_3$ which is not paired receives:

$$y^{(k_3)}(n) = H^{(k_3)}[U^{(k_1)}x^{(k_1)} + U^{(k_2)}x^{(k_2)}] + z^{(k_1)}(n) \; n=1,\ldots,N \quad (6)$$

The total number of users is $K = 2N_{pair} + N_{sing}$, where $N_{pair}$ is the number of pairs of simultaneous transmissions using one TFC slot, and $N_{sing}$ is the number of transmissions to single users. In this case the total number of TFC slots used in one frame is $N = N_{pair} + N_{sing}$, and the total number of configurations Π is much larger.

For example, for K=2,4,6,8,16 we have |Π|=2,10,76,764, 46206736, and with K=4 users we have the following 10 configurations
Π={{(12)(34)}, {(13)(24)}, {(14)(23)}, {(1)(2)(34)}, {(1)(3)(24)}, {(1)(4)(23)}, {(12)(3)(4)}, {(13)(2)(4)}, {(14)(2)(3)}, {(1)(2)(3)(4)}}

User Scheduling Scheme

In order to have a fixed frame length for all configurations with different $N_{pair}$ and $N_{sing}$, one may assume that the $N_{pair}$ pairs of users are served in two TFC slots, thereby essentially doubling their data rate. The $N_{sing}$ unpaired users are allowed, as a compensation, to receive double the power of the paired users. In this way, the total number of TFC slots used in one transmission frame is $N = 2N_{pair} + N_{sing} = K$.

It is now shown how a pairing configuration $\pi = \{\pi_{pair}, \pi_{sing}\}$ can be mapped to a permutation σ of K elements of the form $$\pi \Rightarrow \sigma : \begin{pmatrix} 1 & 2 & \ldots & K \\ \sigma(1) & \sigma(2) & \ldots & \sigma(K) \end{pmatrix}. \quad (7)$$

For example, $$\pi = \{(1,5)(2,4)(3)\} \Rightarrow \sigma : \begin{pmatrix} 1 & 2 & 3 & 4 & 5 \\ 5 & 4 & 3 & 2 & 1 \end{pmatrix}.$$

Under the assumptions made above this limits the permutations σ to have, at most, cycles of length 2.

In this scheduling scheme one may further expand the possible pairing configurations to include any user permutation σ, i.e., to consider K pairs of users (k,σ(k)). For example, one may have a permutation with a cycle of length 4 from $$\pi = \{(1,5)(2,4)(3,3)(4,1)(5,2)\} \Rightarrow \sigma : \begin{pmatrix} 1 & 2 & 3 & 4 & 5 \\ 5 & 4 & 3 & 1 & 2 \end{pmatrix}.$$

The optimization problem can now be written as:

$$\max_{\sigma \in S_K} \sum_{(k,\sigma(k))}^{(K)} f_{(k,\sigma(k))} \quad (8)$$

where $S_K$ denotes the group of all permutations (symmetric group) and θ is some suitable performance measure, such as aggregate mutual information, capacity, signal-to-noise ratio, signal-to-noise-interference ratio (or some function of these), for the users of a given pairing, based on the corresponding signal models (3) and (4). In some cases, the performance measure reflects minimizing error probability, in which the function θ outputs an error measure based at least in part on the equations (3) and (4). Then, the maximization problem is converted to a maximizing function −θ (change of sign).

The Hungarian Method

The above combinatorial optimization problem in Eq. (8) can be solved in polynomial time $O(n^3)$ using a technique known as the Kuhn-Munkres algorithm, and also as the Hungarian method, which is commonly used to solve a so-called assignment problem. Reference in this regard can be made to the attached H. W. Kuhn, "The Hungarian Method for the assignment problem," Naval Research Logistic Quarterly, 2:83-97, 1955.

Assignment problem: Given a weighted complete bipartite graph G=(X∪Y; X×Y), where edge xy has weight w(xy), find a matching M from X to Y with maximum weight.

In a common application, $X=\{x_1:x_2:\ldots x_n\}$ may be a set of workers, $Y=\{y_1, Y_2, \ldots y_n\}$ may be a set of jobs, and w(xy) may be the profit made by assigning worker x to job y.

Mathematically, the problem can be stated as follows: given an n×n matrix $W=[w_{k,t}]=[w(x_k y_t)]$, find a permutation $\sigma \in S_n$ of n elements for which $$\sum_{k=1}^{n} w(x_k y_{\sigma(k)})$$

is a maximum.

Optimal Scheduling

The Hungarian method may be used to solve Eq. (8) by setting $W(x_k y_{\sigma(k)})=\theta_{k,\sigma(k)}$. In this case, the same user can be paired with two different users, in two different the T/F/C slots.

In order to solve the problem of Eq. (5) in the case of even K, it is sufficient to initialize the matrix W with zero entries on the diagonal and symmetric entries $$w_{k_1,k_2} = w_{k_2,k_1} = f_{(k_1,k_2)}.$$

The final solution is found by taking only the pairs (k, σ(k)), for k=1, . . . , K/2.

Figure 2:
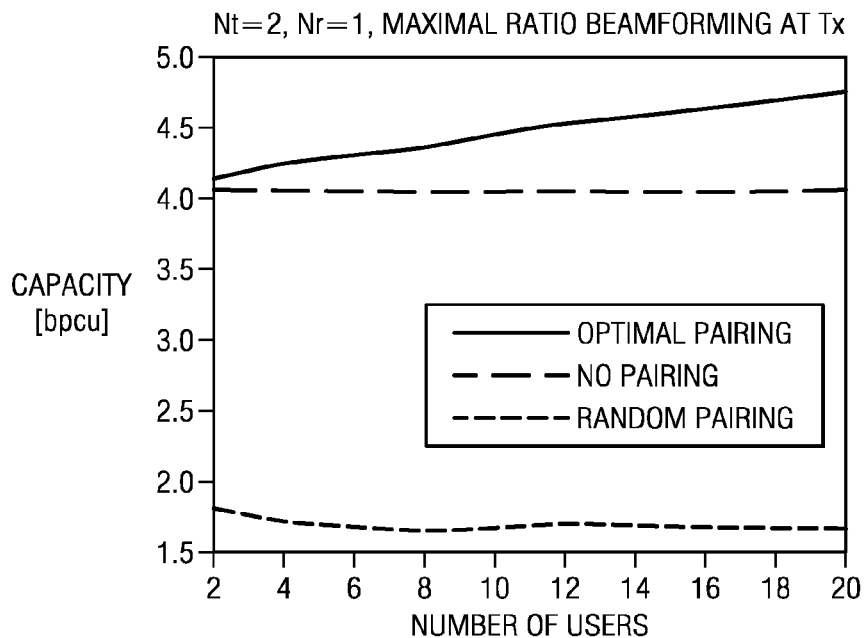
FIG. 2 is a graph that plots capacity versus a number of users, and shows the significant improvement that can be achieved using optimal pairing of users in accordance with the embodiments of this invention, as compared to no pairing and random pairing of users.

Referring to FIG. 2, based on the foregoing it should be appreciated that the use of these exemplary embodiments provides a substantial capacity gain as compared to the single user case, due to the beneficial effect of the optimal user pairing for spatial multiplexing. In particular, the gain achieved by the use of optimal scheduling, as compared to fixed random pairing, increases for increasing numbers of users (note that for K=2 there is obviously no difference). The gain achieved by the use of these exemplary scheduling embodiments is due at least to the reduction of the multiuser interference at the receiver of a given user. In fact, the scheduling solution finds those optimal user pairs that optimize a desired performance measure (as non-limiting examples, maximum capacity or minimum error measure) for K users jointly.

In these exemplary embodiments there is a point-to-multipoint communication link, where the transmit antennas 11A (at the BS 12) can jointly decide their transmission decisions (e.g., form channel matched beams, zero-forcing beams, etc.), and the scheduling decisions depend on the selected beamforming solution and the performance metric used for evaluation. For example, the performance metric may be the sum of the sum of the rates of different pairs of users, so that each user obtains channel access at least once, but preferably twice. The scheduler function 12E preferably forms user pairs with at least two different users in at least two different slots.

Based on the foregoing it should be apparent that the exemplary embodiments of this invention provide a method, apparatus and computer program that implement an optimal polynomial-time algorithm for determining scheduling and beam-assignment of K users to TFC slots, where in at least one slot there are simultaneously at least two users present.

Figure 3:
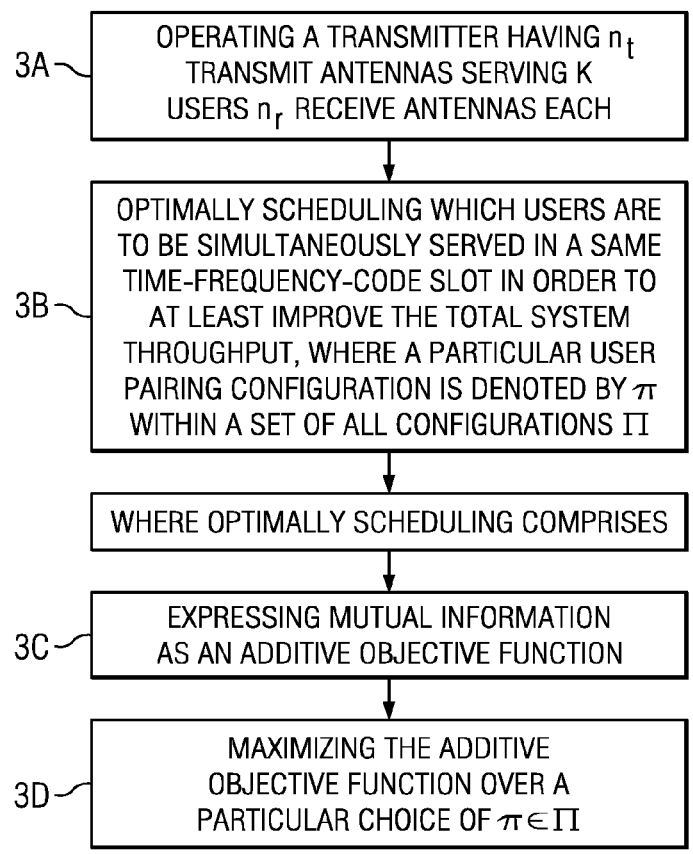
FIG. 3 is a logic flow diagram that is descriptive of a method, and the execution of computer program code, in accordance with the exemplary embodiments of this invention.

Referring to FIG. 3, a method in accordance with this invention includes: (Block 3A) operating a transmitter having $n_t$ transmit antennas serving K users $n_r$ receive antennas each; (Block 3B) optimally scheduling which users are to be simultaneously be served in a same time-frequency-code slot in order to at least improve the total system throughput, where a particular user pairing configuration is denoted by π within a set of all configurations Π, and where optimally scheduling comprises (Block 3C) expressing mutual information as an additive objective function; and (Block 3D) maximizing the additive objective function over a particular choice of π∈Π.

The method of the preceding paragraph, where the additive objective function that is maximized is expressed as:

$$\max_{\pi \in \Pi} \sum_{(k_1,k_2)\in\pi}^{(N)} f_{k_1,k_2}(\pi),$$

and where maximizing uses a method that comprises, given an n×n matrix $W=[w_{k,t}]=[w(x_k y_t)]$, find a permutation $\sigma \in S_n$ of n elements for which $$\sum_{k=1}^{n} w(x_k y_{\sigma(k)})$$

is a maximum.

The method of the preceding paragraph, where for a case of even K, maximizing initialize the matrix W with zero entries on the diagonal and symmetric entries $$w_{k_1,k_2} = w_{k_2,k_1} = f_{(k_1,k_2)},$$

and obtaining a final solution by taking only the pairs (k, σ(k)), for k=1, . . . K/2.

The method of paragraph (A), where there are paired users and unpaired (single) users, where a pairing configuration $\pi=\{\pi_{pair},\pi_{sing}\}$ is mapped to a permutation σ of K elements of the form:

$$\pi \Rightarrow \sigma : \begin{pmatrix} 1 & 2 & \ldots & K \\ \sigma(1) & \sigma(2) & \ldots & \sigma(K) \end{pmatrix}.$$

The method of the previous paragraph, where the additive objective function that is maximized is expressed as:

$$\max_{\sigma \in S_K} \sum_{(k,\sigma(k))}^{(K)} f_{(k,\sigma(k))}$$

Where $S_K$ denotes the group of all permutations (symmetric group), and where maximizing uses a method that comprises, given an n×n matrix
$W=[w_{k,l}]=[w_{(x_k, y_l)}]$,
find a permutation $\sigma \in S_n$ of n elements for which $$\sum_{k=1}^{n} w(x_k, y_{\sigma(k)})$$

is a maximum, and by setting. $w(x_k y_{\sigma(k)})=\theta_{(k, \sigma(k))}$, and where a final solution is found by taking only the pairs $(k, \sigma(k))$, for $k=1, \ldots, K/2$.

The various blocks shown in FIG. 3 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WiMAX and EUTRAN (UTRAN-LTE) systems, it should be appreciated that the exemplary embodiments of this invention are not limited for use with only these particular types of wireless communication system, and that they may be used to advantage in other wireless communication systems. Further, the particular mathematic expressions shown and described above are meant to be exemplary, as changes may be made to these expressions, or other expressions used instead. Further, the use of the Hungarian method is not to be construed as limiting as to techniques that may be used to solve the combinatorial optimization problems expressed by Eqs. (5) and (8).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:
1. A method, comprising:
operating a transmitter connected with a plurality of transmit antennas serving a plurality of users each having a plurality of receive antennas; and
scheduling which ones of the plurality of users are to be simultaneously served in a same time-frequency-code slot, where a particular user pairing configuration is denoted by $\pi$ within a set of all configurations $\Pi$, and where scheduling comprises expressing mutual information as an additive objective function and maximizing the additive objective function over a particular choice of $\pi \in \Pi$, wherein the additive objective function that is maximized comprises:

$$\max_{\pi \in \Pi} \sum_{(k_1,k_2) \in \pi}^{(N)} f_{k_1,k_2}(\pi),$$

where f is measure of performance for a pairing of users $k_1$ and $k_2$ and N is an integer total number of distinct pairs of users.

2. The method of claim 1, wherein there are paired users and unpaired users, wherein a pairing configuration $\pi=\{\pi_{pair}, \pi_{sing}\}$ is mapped to a permutation $\sigma$ of K total number of elements of the form:

$$\pi \Rightarrow \sigma : \begin{pmatrix} 1 & 2 & \ldots & K \\ \sigma(1) & \sigma(2) & \ldots & \sigma(K) \end{pmatrix}.$$

where $\sigma(k)$ is a user paired with user k by the permutation $\sigma$.

3. The method of claim 1, wherein maximizing comprises using an n×n matrix $W=[w_{k,l}]=[w(x_k, y_l)]$, where $w_{k,l}$ is the weight of the $k^{th}$, $l^{th}$ element of the matrix W and $w(x_k, y_l)$ is the weight for a pairing of user $x_k$ and user $y_l$ in the matrix W, and finding a permutation a $\sigma \in S_n$, where $S_n$ denotes the group of all permutations of n number of elements, for which $$\sum_{k=1}^{n} w(x_k y_{\sigma(k)})$$

is a maximum, where W is a total bandwidth occupied and xy is an edge.

4. The method of claim 2, where the additive objective function that is maximized is expressed as:

$$\max_{\sigma \in S_K} \sum_{(k,\sigma(k))}^{(K)} f_{(k,\sigma(k))}$$

where $S_K$ denotes a group of all permutations and k is an individual user from the K total number of elements.

5. The method of claim 3, wherein for a case of an even number of users, maximizing the matrix W with zero entries on the diagonal and symmetric entries for $$w_{k_1,k_2} = w_{k_2,k_1} = f_{(k_1,k_2)},$$

and obtaining a result by taking only the pairs (k,σ(k)), for k=1, ..., K/2, where K is a total number of pairs of users for a given permutation and σ(k) is a user paired with user k by the permutation σ.

6. The method of claim 4, wherein maximizing comprises, given an n×n matrix $[w_{k,l}]=[w(x_k y_l)]$, where $W_{k,l}$ is a weight of the $k^{th}, l^{th}$ element of the matrix W and $w(x_k, y_l)$ is a weight for a pairing of user $x_k$ and user $y_l$ in the matrix W, finding a permutation $\sigma \in S_n$, where $S_n$ denotes the group of all permutations of n number of elements, for which $$\sum_{k=1}^{n} w(x_k y_{\sigma(k)})$$

is a maximum, and by setting $w(x_k y_{\sigma(k)})=f_{(k,\sigma(k))}$, and where a result is found by taking only the pairs (k,σ(k)), for k=1, ..., K/2, where W is a total bandwidth occupied and xy is an edge.

7. An apparatus, comprising:
at least one processor;
at least one memory including computer program code;
the at least one memory and the computer program code configured to, with the at least one processor, cause the apparatus at least to:
operate a transmitter connected with a plurality of transmit antennas serving a plurality of users each having a plurality of receive antennas; and
schedule which ones of the plurality of users are to be simultaneously served in a same time-frequency-code slot, where a particular user pairing configuration is denoted by π within a set of all configurations Π, and where scheduling comprises expressing mutual information as an additive objective function and maximizing the additive objective function over a particular choice of π∈Π, wherein the additive objective function that is maximized comprises:

$$\max_{\pi \in \Pi} \sum_{(k_1,k_2) \in \pi}^{(N)} f_{k_1,k_2}(\pi),$$

where f is measure of performance for a pairing of users $k_1$ and $k_2$ and N is an integer total number of distinct pairs of users.

8. The apparatus of claim 7, wherein there are paired users and unpaired users, wherein a pairing configuration $\pi=\{\pi_{pair}, \pi_{Sing}\}$ is mapped to a permutation σ of K total number of elements of the form:

$$\pi \Rightarrow \sigma : \begin{pmatrix} 1 & 2 & \ldots & K \\ \sigma(1) & \sigma(2) & \ldots & \sigma(K) \end{pmatrix},$$

where σ(k) is a user paired with user k by the permutation σ.

9. The apparatus of claim 7, wherein the apparatus is embodied as at least one integrated circuit.

10. The apparatus of claim 7, wherein maximizing comprises using an n×n matrix $W=[w_{k,l}]=[w(x_k y_l)]$, where $W_{k,l}$ is the weight of the $k^{th}, l^{th}$ element of the matrix W and $w(x_k, y_l)$ is the weight for a pairing of user $x_k$ and user $y_l$ in the matrix W, and finding a permutation $\sigma \in S_n$, where $S_n$ denotes the group of all permutations of n number of elements, for which $$\sum_{k=1}^{n} w(x_k y_{\sigma(k)})$$

is a maximum, where W is a total bandwidth occupied and xy is an edge.

11. The apparatus of claim 8, where the additive objective function that is maximized is expressed as:

$$\max_{\sigma \in S_K} \sum_{(k,\sigma(k))}^{(K)} f_{(k,\sigma(k))}$$

where $S_K$ denotes a group of all permutations and k is an individual user from the total number of users K, and where maximizing comprises, given an n×n matrix $W=[w_{k,l}]=[w(x_k, y_l)]$, where $w_{k,l}$ is the weight of the $k^{th}, l^{th}$ element of the matrix W and $w(x_k, y_l)$ is the weight for a pairing of user $x_k$ and user $y_l$ in the matrix W, finding a permutation $\sigma \in S_n$, where $S_n$ denotes the group of all permutations of n number of elements, for which $$\sum_{k=1}^{n} w(x_k y_{\sigma(k)})$$

is a maximum, and by setting $W(x_k y_{\sigma(k)})=f_{(k,\sigma(k))}$, and where a result is found by taking only the pairs (k,σ(k)), for k=1, ..., K/2, where W is a total bandwidth occupied and xy is an edge.

12. The apparatus of claim 10, wherein for a case of an even number of users, maximizing the matrix W with zero entries on the diagonal and symmetric entries for $$w_{k_1,k_2} = w_{k_2,k_1} = f_{(k_1,k_2)},$$

and obtaining a result by taking only the pairs (k,σ(k)), for k=1, . . . , K/2, where K is a total number of pairs of users for a given permutation and σ(k) is a user paired with user k by the permutation σ.

13. A non-transitory computer-readable storage medium tangibly embodying computer program code configured to, with at least one processor, perform operations, the operations comprising:

operating a transmitter connected with a plurality of transmit antennas serving a plurality of users each having a plurality of receive antennas; and scheduling which ones of the plurality of users are to be simultaneously served in a same time-frequency-code slot, where a particular user pairing configuration is denoted by π within a set of all configurations Π, and where scheduling comprises expressing mutual information as an additive objective function and maximizing the additive objective function over a particular choice of π∈Π, wherein the additive objective function that is maximized comprises:

$$\max_{\pi \in \Pi} \sum_{(k_1,k_2) \in \pi}^{(N)} f_{k_1,k_2}(\pi),$$

where f is measure of performance for a pairing of users $k_1$ and $k_2$ and N is an integer total number of distinct airs of users.

14. The non-transitory computer-readable storage medium of claim 13, wherein there are paired users and unpaired users, wherein a pairing configuration $\pi=\{\pi_{pair},\pi_{sing}\}$ is mapped to a permutation σ of K total number of elements of the form:

$$\pi \Rightarrow \sigma : \begin{pmatrix} 1 & 2 & \ldots & K \\ \sigma(1) & \sigma(2) & \ldots & \sigma(K) \end{pmatrix},$$

where σ(k) is a user paired with user k by the permutation σ.

15. The non-transitory computer-readable storage medium of claim 13, wherein maximizing comprises using an n×n matrix W=[$w_{k,l}$]=[w($x_k y_l$)], where $w_{k,l}$ is the weight of the $k^{th}$, $l^{th}$ element of the matrix W and w($x_k$, $y_l$) is the weight for a pairing of user $x_k$ and user $y_l$ in the matrix W, and finding a permutation σ∈$S_n$, where $S_n$ denotes the group of all permutations of n number of elements, for which $$\sum_{k=1}^{n} w(x_k y_{\sigma(k)})$$

is a maximum, where W is a total bandwidth occupied and xy is an edge.

16. non-transitory computer-readable storage medium of claim 14, where the additive objective function that is maximized is expressed as:

$$\max_{\sigma \in S_K} \sum_{(k,\sigma(k))}^{(K)} f_{(k,\sigma(k))}$$

where $S_K$ denotes a group of all permutations and k is an individual user from the total number of users K, and where maximizing comprises, given an n×n matrix W=[$w_{k,l}$]=[w($x_k y_l$)], where $w_{k,l}$ is the weight of the $k^{th}$, $l^{th}$ element of the matrix W and w($x_k$, $y_l$) is the weight for a pairing of user $x_k$ and user $y_l$ in the matrix W, finding a permutation σ∈$S_n$, where $S_n$ denotes the group of all permutations of n number of elements, for which $$\sum_{k=1}^{n} w(x_k y_{\sigma(k)})$$

is a maximum, and by setting w($x_k y_{\sigma(k)}$)=$f_{(k,\sigma(k))}$, and where a result is found by taking only the pairs (k,σ(k)), for k=1, . . . , K/2, where W is a total bandwidth occupied and xy is an edge.

17. The non-transitory computer-readable storage medium of claim 15, wherein for a case of an even number of users, maximizing the matrix W with zero entries on the diagonal and symmetric entries for $$w_{k_1,k_2} = w_{k_2,k_1} = f_{(k_1,k_2)},$$

and obtaining a result by taking only the pairs (k,σ(k)), for k=1, . . . , K/2, where K is a total number of pairs of users for a given permutation and σ(k) is a user paired with user k by the permutation σ.

* * * * *

UNITED STATES PATENT AND TRADEMARK OFFICE
CERTIFICATE OF CORRECTION

PATENT NO. : 8,385,310 B2
APPLICATION NO. : 12/344384
DATED : February 26, 2013
INVENTOR(S) : Ari Tapani Hottinen et al.

It is certified that error appears in the above-identified patent and that said Letters Patent is hereby corrected as shown below:

In the Claims:

In Claim 3:
Column 10, line 66, the "a" after "finding a permutation" should be deleted.

In Claim 6:
Column 11, line 33, " $[w_{k,l}]=[w(x_k,y_l)]$ " should be deleted and -- $W = [w_{k,\ell}] = [w(x_k y_\ell)]$ -- should be inserted.

In Claim 10:
Column 12, line 24, " $W_{k,l}$ " should be deleted and -- $w_{k,l}$ -- should be inserted.

In Claim 11:
Column 12, lines 49-50, " $W=[w_{k,l}]=[w(x_k,y_l)]$ " should be deleted and -- $W = [w_{k,\ell}] = [w(x_k y_\ell)]$ -- should be inserted.

In Claim 11:
Column 12, line 62, " $W(x_k y_{\sigma(k)})=f_{(k,\sigma(k))}$ " should be deleted and -- $w(x_k y_{\sigma(k)}) = f_{(k,\sigma(k))}$ -- should be inserted.

In Claim 13:
Column 13, line 32, "airs" should be deleted and -- pairs -- should be inserted.

In Claim 16:
Column 14, line 8, -- The -- should be inserted before "non-transitory".

Signed and Sealed this
Thirtieth Day of April, 2013

Teresa Stanek Rea
*Acting Director of the United States Patent and Trademark Office*